US012497897B1

United States Patent
Greene et al.

(10) Patent No.: US 12,497,897 B1
(45) Date of Patent: Dec. 16, 2025

(54) AIRFOIL COMPONENT FOR TURBOMACHINE COMPONENT WITH PLATFORM COOLING USING AIRFOIL COOLANT

(71) Applicant: GE Infrastructure Technology LLC, Greenville, SC (US)

(72) Inventors: John Ellington Greene, Greenville, SC (US); Benjamin Paul Lacy, Greer, SC (US); Brad Wilson VanTassel, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/822,917

(22) Filed: Sep. 3, 2024

(51) Int. Cl.
*F01D 5/18* (2006.01)
*F01D 25/12* (2006.01)

(52) U.S. Cl.
CPC ............. *F01D 5/187* (2013.01); *F01D 5/186* (2013.01); *F01D 5/189* (2013.01); *F01D 25/12* (2013.01); *F05D 2230/60* (2013.01); *F05D 2260/201* (2013.01)

(58) Field of Classification Search
CPC . F01D 5/18; F01D 5/186; F01D 5/188; F01D 5/189; F01D 25/12; F01D 9/02; F01D 9/04; F01D 9/041
See application file for complete search history.

(56) References Cited

U.S. PATENT DOCUMENTS

| | | | |
|---|---|---|---|
| 6,382,908 B1 | 5/2002 | Keith et al. | |
| 6,887,033 B1 * | 5/2005 | Phillips | F01D 5/147 415/115 |
| 7,080,971 B2 * | 7/2006 | Wilson | F01D 5/20 416/96 A |
| 7,775,769 B1 | 8/2010 | Liang | |
| 8,142,137 B2 * | 3/2012 | Johnston | F01D 5/188 416/500 |
| 8,162,617 B1 * | 4/2012 | Davies | F01D 5/189 416/223 R |
| 8,702,374 B2 * | 4/2014 | Butler | F01D 9/02 415/115 |

(Continued)

FOREIGN PATENT DOCUMENTS

FR     2740828 A2 *  5/1997 ............. F01D 5/187

*Primary Examiner* — Alain Chau
(74) *Attorney, Agent, or Firm* — Charlotte Wilson; James Pemrick; Hoffman Warnick LLC

(57) ABSTRACT

An airfoil component includes an airfoil body having a pressure side, a suction side, a trailing edge, and an airfoil mount. A collection plenum is defined in the airfoil body and is configured to collect coolant exiting from impingement openings in an impingement member therein. Cooling passages are defined in the airfoil body and in fluid communication with the collection plenum and extend to first film cooling opening(s) in part(s) of the airfoil body. A mount cooling plenum is defined, at least in part, in the airfoil mount and in fluid communication with the collection plenum. Second cooling openings are defined in the flow path facing surface of the airfoil mount downstream of the trailing edge and are in fluid communication with the mount cooling plenum. The second film cooling holes cool the airfoil mount and any platform coupled thereto. The airfoil component can be additively manufactured.

20 Claims, 10 Drawing Sheets

(56) References Cited

U.S. PATENT DOCUMENTS

| | | | |
|---|---|---|---|
| 8,905,714 B2* | 12/2014 | Ellis | F01D 5/188 |
| | | | 416/97 R |
| 9,249,674 B2* | 2/2016 | Ellis | F01D 5/187 |
| 9,896,951 B2 | 2/2018 | Facchinetti et al. | |
| 9,982,542 B2* | 5/2018 | Lewis | F01D 5/187 |
| 10,227,876 B2 | 3/2019 | Buhler et al. | |
| 10,323,523 B2* | 6/2019 | Bahador | F01D 5/087 |
| 10,513,933 B2* | 12/2019 | Mugglestone | F01D 5/188 |
| 11,220,916 B2* | 1/2022 | Snider | B22F 5/04 |
| 11,248,471 B2* | 2/2022 | Snider | B33Y 80/00 |
| 12,215,605 B2* | 2/2025 | Matsuo | F01D 5/18 |
| 2003/0138322 A1* | 7/2003 | Boury | F01D 5/187 |
| | | | 416/97 R |
| 2004/0265128 A1 | 12/2004 | Scott et al. | |
| 2005/0100437 A1* | 5/2005 | Phillips | F01D 5/186 |
| | | | 415/115 |
| 2006/0263221 A1 | 11/2006 | Cunha et al. | |
| 2009/0208325 A1 | 8/2009 | Devore et al. | |
| 2010/0129196 A1* | 5/2010 | Johnston | F02C 7/12 |
| | | | 415/115 |
| 2010/0135772 A1 | 6/2010 | Liang | |
| 2012/0195737 A1* | 8/2012 | Butler | F01D 9/02 |
| | | | 415/189 |
| 2014/0130354 A1 | 5/2014 | Pal et al. | |
| 2014/0234088 A1* | 8/2014 | Brandl | F01D 5/30 |
| | | | 415/177 |
| 2015/0152735 A1 | 6/2015 | Molter et al. | |
| 2015/0267549 A1 | 9/2015 | Facchinetti et al. | |
| 2016/0017720 A1* | 1/2016 | Lewis | F01D 5/187 |
| | | | 416/1 |
| 2016/0047251 A1* | 2/2016 | Xu | F01D 5/189 |
| | | | 416/97 R |
| 2016/0102562 A1* | 4/2016 | Evans | F01D 5/186 |
| | | | 416/95 |
| 2017/0081960 A1 | 3/2017 | Lee et al. | |
| 2017/0101891 A1 | 4/2017 | Dutta et al. | |
| 2017/0159449 A1 | 6/2017 | Buhler et al. | |
| 2017/0370230 A1* | 12/2017 | Bahador | F01D 5/087 |
| 2017/0370231 A1 | 12/2017 | Lee et al. | |
| 2018/0230836 A1* | 8/2018 | Tibbott | F01D 25/12 |
| 2021/0222566 A1* | 7/2021 | Snider | F01D 5/186 |
| 2024/0117746 A1* | 4/2024 | Matsuo | F01D 9/065 |

* cited by examiner

AIRFOIL COMPONENT FOR TURBOMACHINE COMPONENT WITH PLATFORM COOLING USING AIRFOIL COOLANT

GOVERNMENT RIGHTS

This application was made with government support under contract number DE-FE0031611 awarded by the Department of Energy. The US government has certain rights in the invention.

TECHNICAL FIELD

The disclosure relates generally to turbomachine components and, more specifically, to turbomachine component including an airfoil component with cooling passages for platform cooling using coolant from an airfoil.

BACKGROUND

Turbomachine components, such as turbomachine blades or nozzles, include an airfoil body and a platform at an inner end and possibly an outer end of the airfoil body. High temperature areas in sidewalls of the platforms are typically cooled through openings in the sidewall. One challenge with cooling in this manner is that braze material(s) used to couple parts of the turbomachine nozzle can fill the cooling holes. Casting in cooling passages and film cooling holes for the sidewall is very challenging because the cores are fragile, very complex and costly. In particular, supplying film cooling passages and openings for the platform directly behind the airfoil body trailing edge and along the sidewall of the platform is challenging using conventional cast parts and drilling. Additive manufacturing such as direct metal laser melting (DMLM) or selective laser melting (SLM) has emerged as a reliable manufacturing method for making industrial components.

BRIEF DESCRIPTION

All aspects, examples and features mentioned below can be combined in any technically possible way.

An aspect of the disclosure includes an airfoil component, comprising: an airfoil body having a pressure side, a suction side, and a trailing edge; an airfoil mount coupled to at least one end of the airfoil body, each airfoil mount including a flow path facing surface and a sidewall; a primary cooling plenum extending through the airfoil body for directing a coolant therethrough; an impingement cooling member within the primary cooling plenum, the impingement cooling member including a plurality of impingement openings defined therein configured to direct the coolant from the primary cooling plenum toward an inner surface of part of the airfoil body; a collection plenum defined in the airfoil body configured to collect the coolant exiting the plurality of impingement openings; a plurality of cooling passages defined in the airfoil body and in fluid communication with the collection plenum, each of the plurality of cooling passages extending to at least one first film cooling opening through one of the pressure side, the suction side, or the trailing edge of the airfoil body; a mount cooling plenum defined, at least in part, in each airfoil mount and in fluid communication with the collection plenum; and a plurality of second cooling openings defined in the flow path facing surface of each airfoil mount downstream of the trailing edge, the plurality of second cooling openings in fluid communication with the mount cooling plenum.

Another aspect of the disclosure includes any of the preceding aspects, and the plurality of second cooling openings is arranged in a line parallel to a sidewall of each airfoil mount.

Another aspect of the disclosure includes any of the preceding aspects, and the sidewall of each airfoil mount downstream of the trailing edge is curved around the trailing edge of the airfoil body, and the plurality of second cooling openings is arranged in a line curving parallel to the sidewall of each airfoil mount downstream of the trailing edge.

Another aspect of the disclosure includes any of the preceding aspects, and each of the plurality of second cooling openings includes a diffuser shaped opening.

Another aspect of the disclosure includes any of the preceding aspects, and a subset of the plurality of cooling passages extends through a trailing portion of the airfoil body to the at least one first film cooling opening in the trailing edge, wherein the mount cooling plenum extends in the airfoil mount parallel to the subset of the plurality of cooling passages extending through the trailing portion of the airfoil body.

Another aspect of the disclosure includes any of the preceding aspects, and the airfoil component includes a plurality of parallel sintered metal layers throughout an entire height thereof.

Another aspect of the disclosure includes any of the preceding aspects, and the airfoil mount coupled to the at least one end of the airfoil body includes an outer airfoil mount on a first end of the airfoil body and an inner airfoil mount on an opposing, second end of the airfoil body.

An aspect of the disclosure includes a turbomachine component including the airfoil component of any of the preceding aspects, and further comprising a platform coupled to each airfoil mount around the sidewall thereof, wherein the coolant from the plurality of second cooling openings defined in the flow path facing surface thereof cools a respective platform.

Another aspect of the disclosure includes a turbomachine, comprising: a compressor; a combustor operatively coupled to the compressor; and a turbine operatively coupled to the combustor, the turbine including an airfoil component including: an airfoil body having a pressure side, a suction side, and a trailing edge; an airfoil mount coupled to at least one end of the airfoil body, each airfoil mount including a flow path facing surface and a sidewall; a primary cooling plenum extending through the airfoil body for directing a coolant therethrough; an impingement cooling member within the primary cooling plenum, the impingement cooling member including a plurality of impingement openings defined therein configured to direct the coolant from the primary cooling plenum toward an inner surface of part of the airfoil body; a collection plenum defined in the airfoil body configured to collect the coolant exiting the plurality of impingement openings; a plurality of cooling passages defined in the airfoil body and in fluid communication with the collection plenum, each of the plurality of cooling passages extending to at least one first film cooling opening through one of the pressure side, the suction side, or the trailing edge of the airfoil body; a mount cooling plenum defined, at least in part, in each airfoil mount and in fluid communication with the collection plenum; and a plurality of second cooling openings defined in the flow path facing surface of each airfoil mount downstream of the trailing edge, the plurality of second cooling openings in fluid communication with the mount cooling plenum.

Another aspect of the disclosure includes any of the preceding aspects, and the plurality of second cooling openings is arranged in a line parallel to the sidewall of each airfoil mount.

Another aspect of the disclosure includes any of the preceding aspects, and the sidewall of each airfoil mount is downstream of the trailing edge of the airfoil body and is curved around the trailing edge of the airfoil body, and the plurality of second cooling openings is arranged in a line curving parallel to the sidewall of each airfoil mount downstream of the trailing edge.

Another aspect of the disclosure includes any of the preceding aspects, and each the plurality of second cooling openings includes a diffuser shaped opening.

Another aspect of the disclosure includes any of the preceding aspects, and a subset of the plurality of cooling passages extends through a trailing portion of the airfoil body to the at least one first film cooling opening in the trailing edge, wherein the mount cooling plenum extends in the airfoil mount parallel to the subset of the plurality of cooling passages extending through the trailing portion of the airfoil body.

Another aspect of the disclosure includes any of the preceding aspects, and the airfoil component includes a plurality of parallel sintered metal layers throughout an entire height thereof.

Another aspect of the disclosure includes any of the preceding aspects, and the airfoil mount coupled to the at least one end of the airfoil body includes an outer airfoil mount on a first end of the airfoil body and an inner airfoil mount on an opposing, second end of the airfoil body.

Another aspect of the disclosure includes any of the preceding aspects, and further comprising a platform coupled to each airfoil mount around the sidewall thereof, wherein the coolant from the plurality of second cooling openings defined in the flow path facing surface thereof cools a respective platform.

Another aspect of the disclosure includes a method, comprising: additively manufacturing an airfoil component, the airfoil component including: an airfoil body having a pressure side, a suction side, and a trailing edge; an airfoil mount coupled to at least one end of the airfoil body, each airfoil mount including a flow path facing surface and a sidewall; a primary cooling plenum extending through the airfoil body for directing a coolant therethrough; an impingement cooling member within the primary cooling plenum, the impingement cooling member including a plurality of impingement openings defined therein configured to direct the coolant from the primary cooling plenum toward an inner surface of part of the airfoil body; a collection plenum defined in the airfoil body configured to collect coolant exiting the plurality of impingement openings; a plurality of cooling passages defined in the airfoil body and in fluid communication with the collection plenum, each of the plurality of cooling passages extending to at least one first film cooling opening through one of the pressure side, the suction side, or the trailing edge of the airfoil body; a mount cooling plenum defined, at least in part, in the airfoil mount and in fluid communication with the collection plenum; and a plurality of second cooling openings defined in the flow path facing surface of each airfoil mount downstream of the trailing edge, the plurality of second cooling openings in fluid communication with the mount cooling plenum, wherein the airfoil component includes a plurality of parallel sintered metal layers throughout an entire height thereof; and coupling the airfoil component to at least one platform having an opening configured to mate with the airfoil mount, wherein the coolant from the plurality of second cooling openings defined in the flow path facing surface of the airfoil mount cools a respective platform.

Another aspect of the disclosure includes any of the preceding aspects, and the plurality of second cooling openings is arranged in a line parallel to the sidewall of each airfoil mount.

Another aspect of the disclosure includes any of the preceding aspects, and the sidewall of the airfoil mount is downstream of the trailing edge of the airfoil body and curved around the trailing edge of the airfoil body, and the plurality of second cooling openings is arranged in a line curving parallel to the sidewall of each airfoil mount downstream of the trailing edge.

Another aspect of the disclosure includes any of the preceding aspects, and a subset of the plurality of cooling passages extends through a trailing portion of the airfoil body to the at least one first film cooling opening in the trailing edge, wherein the mount cooling plenum extends in the airfoil mount parallel to the subset of the plurality of cooling passages extending through the trailing portion of the airfoil body.

Two or more aspects described in this disclosure, including those described in this summary section, may be combined to form implementations not specifically described herein. That is, all embodiments described herein can be combined with each other.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
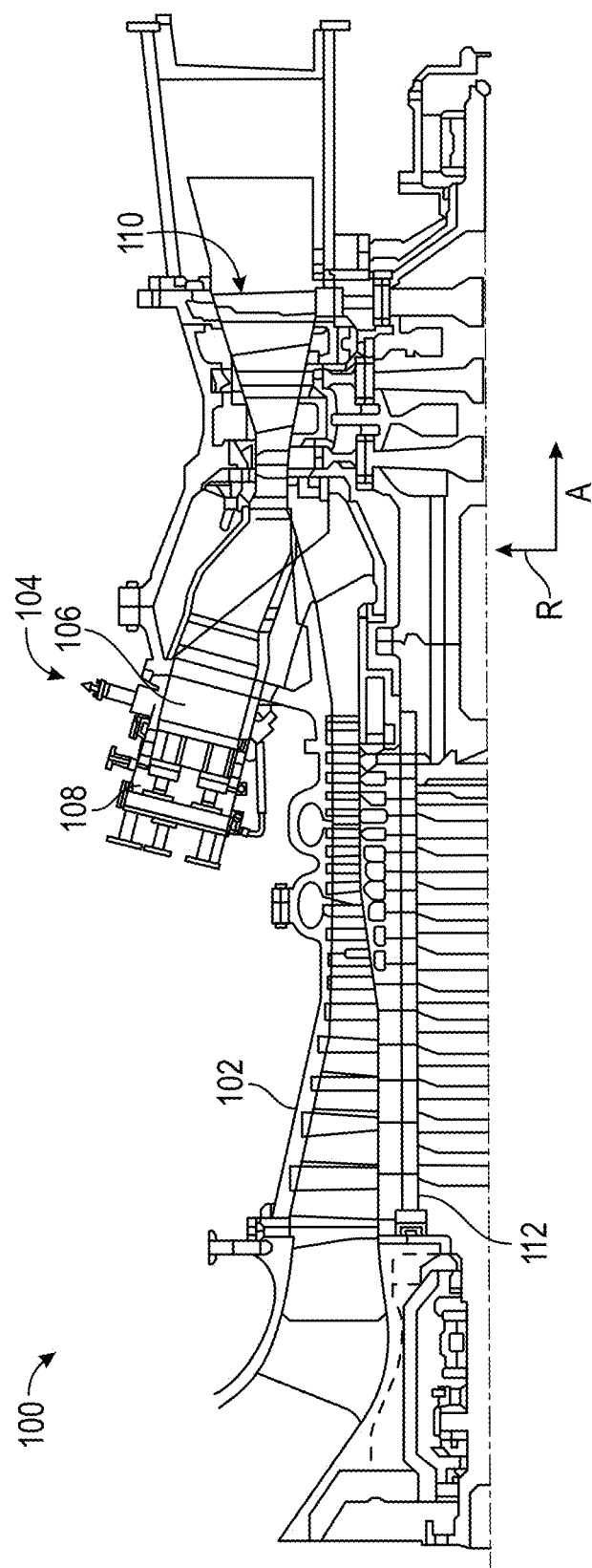
FIG. 1 shows a schematic view of an illustrative turbomachine in the form of a gas turbine system and including an airfoil component, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current disclosure, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As indicated above, the disclosure provides an airfoil component and a turbomachine component including the airfoil component. The airfoil component includes an airfoil body having a pressure side, a suction side, and a trailing edge, and an airfoil mount coupled to at least one end of the airfoil body. Each airfoil mount includes a flow path facing surface and a sidewall. A primary cooling plenum extends through the airfoil body for directing a coolant therethrough. An impingement cooling member is within the primary cooling plenum and includes a plurality of impingement openings defined therein, which are configured to direct the coolant from the primary cooling plenum toward an inner surface of part of the airfoil body. A collection plenum is defined in the airfoil body and is configured to collect coolant (i.e., post-impingement coolant) exiting the plurality of impingement openings. A plurality of cooling passages is defined in the airfoil body and is in fluid communication with the collection plenum. Each of the cooling passages extends to at least one cooling opening through one of the pressure side, the suction side, or the trailing edge of the airfoil body. A mount cooling plenum is defined, at least in part, in the airfoil mount and in fluid communication with the collection plenum. A plurality of cooling openings is defined in the flow path facing surface of the airfoil mount downstream of the trailing edge and is in fluid communication with the mount cooling plenum. The airfoil component can be additively manufactured. The cooling arrangement provides more precise airfoil mount cooling and allows cooling of a platform in an area where a connection, such as fillet connection or braze material, would normally block cooling passages in the platform, e.g., between a trailing edge of the airfoil body and a sidewall of the platform. Hence, the airfoil component allows cooling in a manner not previously possible using conventional manufacturing techniques, resulting in improved overall performance for the turbomachine component including the airfoil component and the turbomachine.

FIG. 1 shows a schematic illustration of an illustrative turbomachine, which may include a turbomachine component including an airfoil component according to teachings of the disclosure. In the example, a turbomachine 100 is in the form of a combustion or gas turbine (GT) system. Turbomachine 100 includes a compressor 102 and a combustor 104. Combustor 104 includes a combustion region 106 and a fuel nozzle assembly 108. Turbomachine 100 also includes a turbine 110 (e.g., an expansion turbine) and a common compressor/turbine shaft or rotor 112.

In one embodiment, turbomachine 100 is a 7HA.03 engine, commercially available from GE Vernova. The present disclosure is not limited to any one particular GT system and may be implemented in connection with other engines including, for example, the other HA, F, B, LM, GT, TM and E-class engine models of GE Vernova, and engine models of other companies. Furthermore, the present disclosure is not limited to any particular turbomachine, and may be applicable to, for example, steam turbines, jet engines, compressors, turbofans, etc. Moreover, the present disclosure is not limited to any particular turbomachine component and may be applicable to any turbomachine component that employs airfoils, airfoil mounts and/or platforms that require cooling.

In operation, air flows through compressor 102, and compressed air is supplied to combustor 104. Specifically, the compressed air is supplied to fuel nozzle assembly 108 that is integral to combustor 104. Fuel nozzle assembly 108 is in flow communication with combustion region 106. Fuel nozzle assembly 108 is also in flow communication with a fuel source (not shown in FIG. 1) and channels fuel and air to combustion region 106. Combustor 104 ignites and combusts fuel. Combustor 104 is in flow communication with turbine 110 within which gas stream thermal energy is converted to mechanical rotational energy. Turbine 110 rotatably couples to and drives rotor 112. Compressor 102 also is rotatably coupled to rotor 112. In the illustrative embodiment, there are a plurality of combustors 104 and fuel nozzle assemblies 108.

Figure 2:
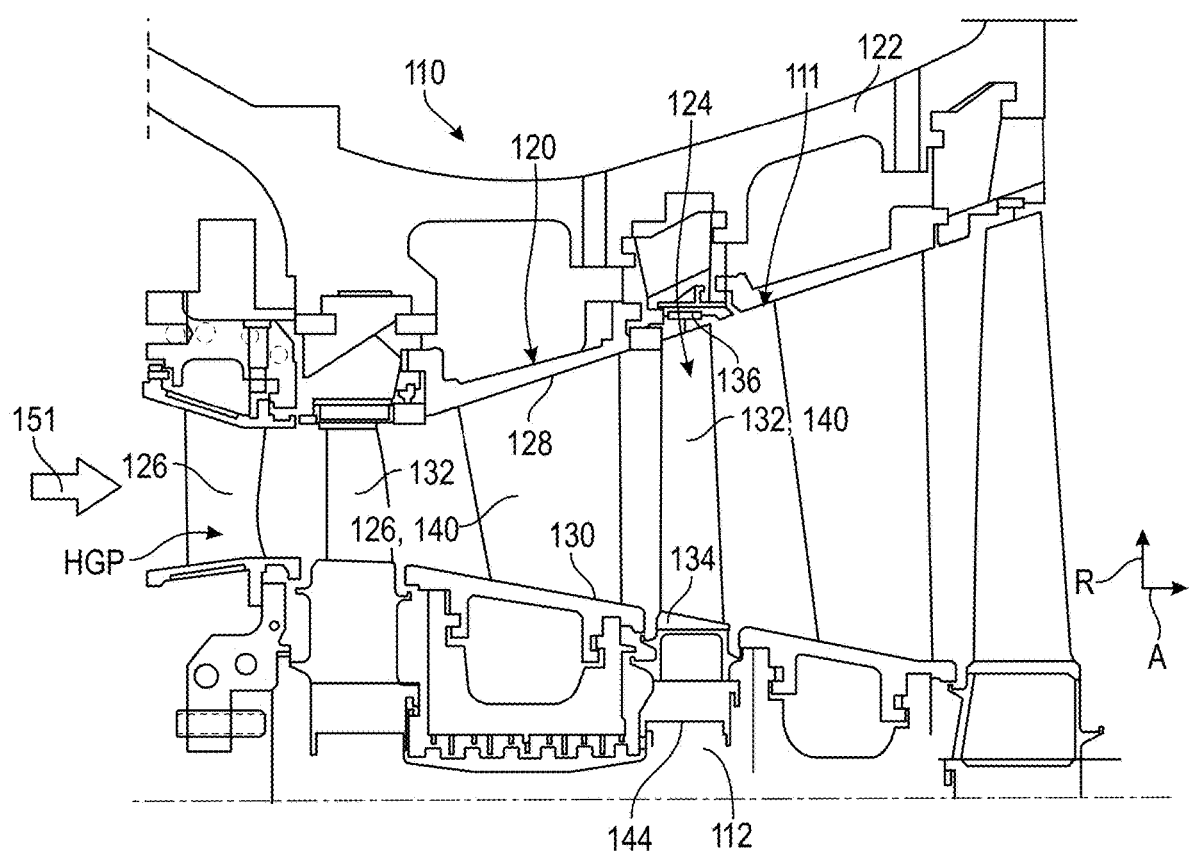
FIG. 2 shows a cross-sectional view of an illustrative gas turbine that may be used with the gas turbine system in FIG. 1 and that includes an airfoil component, according to embodiments of the disclosure.

FIG. 2 shows a cross-sectional view of an illustrative turbine 110 that may be used with the gas turbine system in FIG. 1. Turbine 110 includes a row of nozzle or vanes 120 coupled to a stationary casing 122 of turbomachine 100 (FIG. 1) and axially adjacent a row 124 of rotating blades 132. A stationary vane or nozzle 126 may be held in turbine 110 by a radially outer platform 128 and a radially inner platform 130. Row 124 of blades in turbine 110 includes rotating blades 132 coupled to rotor 112 and rotating with the rotor 112. Rotating blades 132 may include a radially inner platform 134 coupled (e.g., via a shank and/or dovetail) to rotor 112 and, optionally, a radially outer tip shroud 136 (at tip of blade).

Platforms 128, 130, 134 may include any now known or later developed platform structure configured to define part of the hot gas path adjacent an airfoil body of nozzle 126 or rotating blade 132. Platforms 128, 130 are also configured for coupling to airfoil components 138 according to embodiments of the disclosure. For example, platforms 128, 130 may include any now known or later developed opening 131 (FIGS. 3-5) configured to mate with and couple to an airfoil mount 154 of airfoil component 138 according to embodiments of the disclosure. The connections can include any now known or later developed fastener structure such as but not limited to mechanical fasteners and/or welds, and allows removal and/or replacement of airfoil component 138 from platforms 128, 130 during servicing of turbine 110.

For purposes of description, a "turbomachine component" will be described as a stationary nozzle 126. However, the teachings of the disclosure may also be applied to the airfoil body and platform 134 of rotating blades 132. More particularly, embodiments of the disclosure described herein may include aspects applicable to either stationary nozzle 126, turbine rotating blade 132, and/or any other turbomachine component that employs airfoil components including airfoil bodies coupled with platforms. As will be described in greater detail herein, blade 132 or nozzle 126 may include internal cooling structures including sources of coolant such as passages, conduits, and other structure that deliver coolant to, among other locations, a surface thereof for film cooling. Coolant may include, for example, air from compressor 102.

Figure 3:
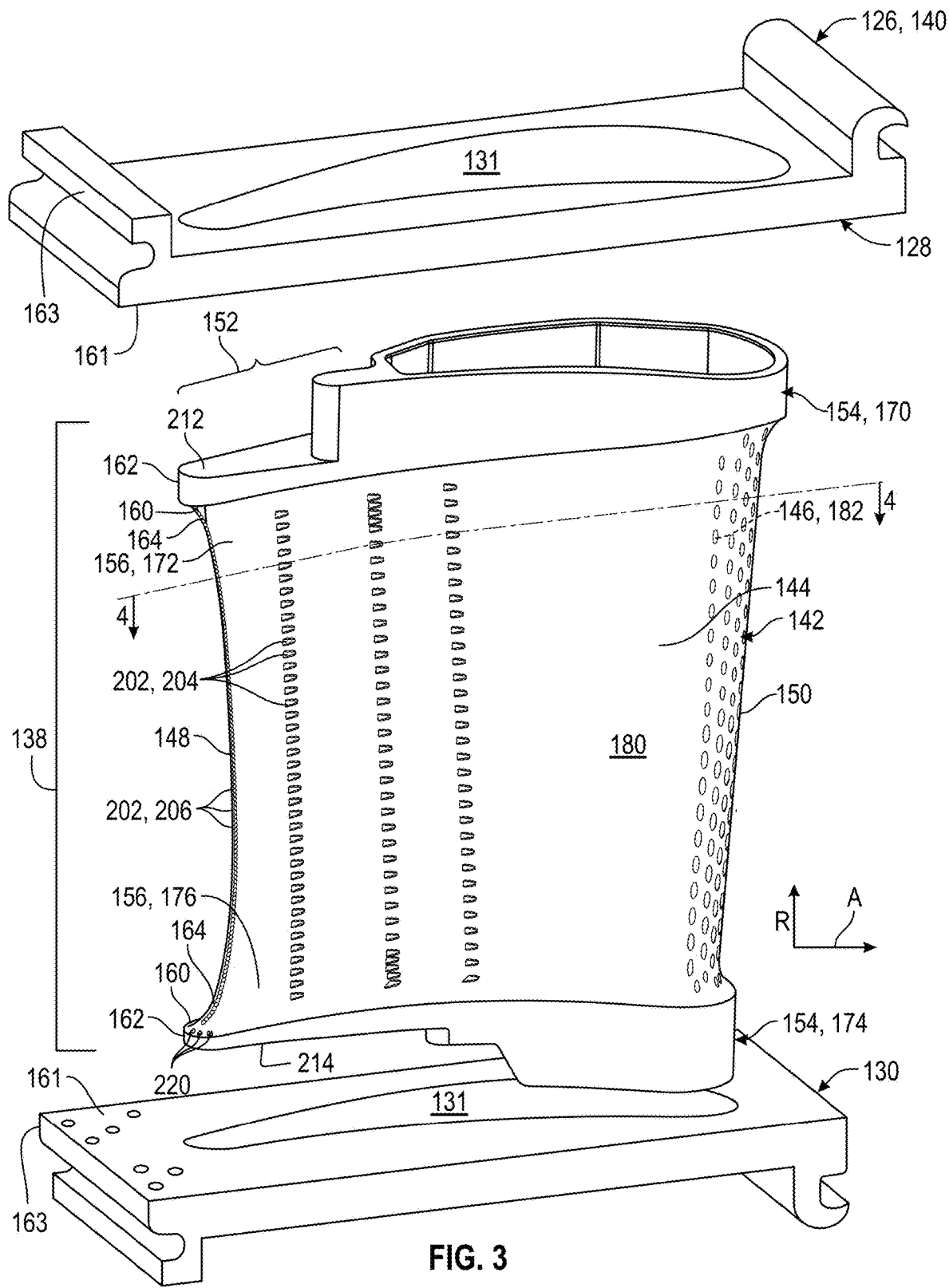
FIG. 3 shows a perspective view of a turbomachine component in the form of a stationary nozzle and including an airfoil component, according to embodiments of the disclosure.
Figure 4:
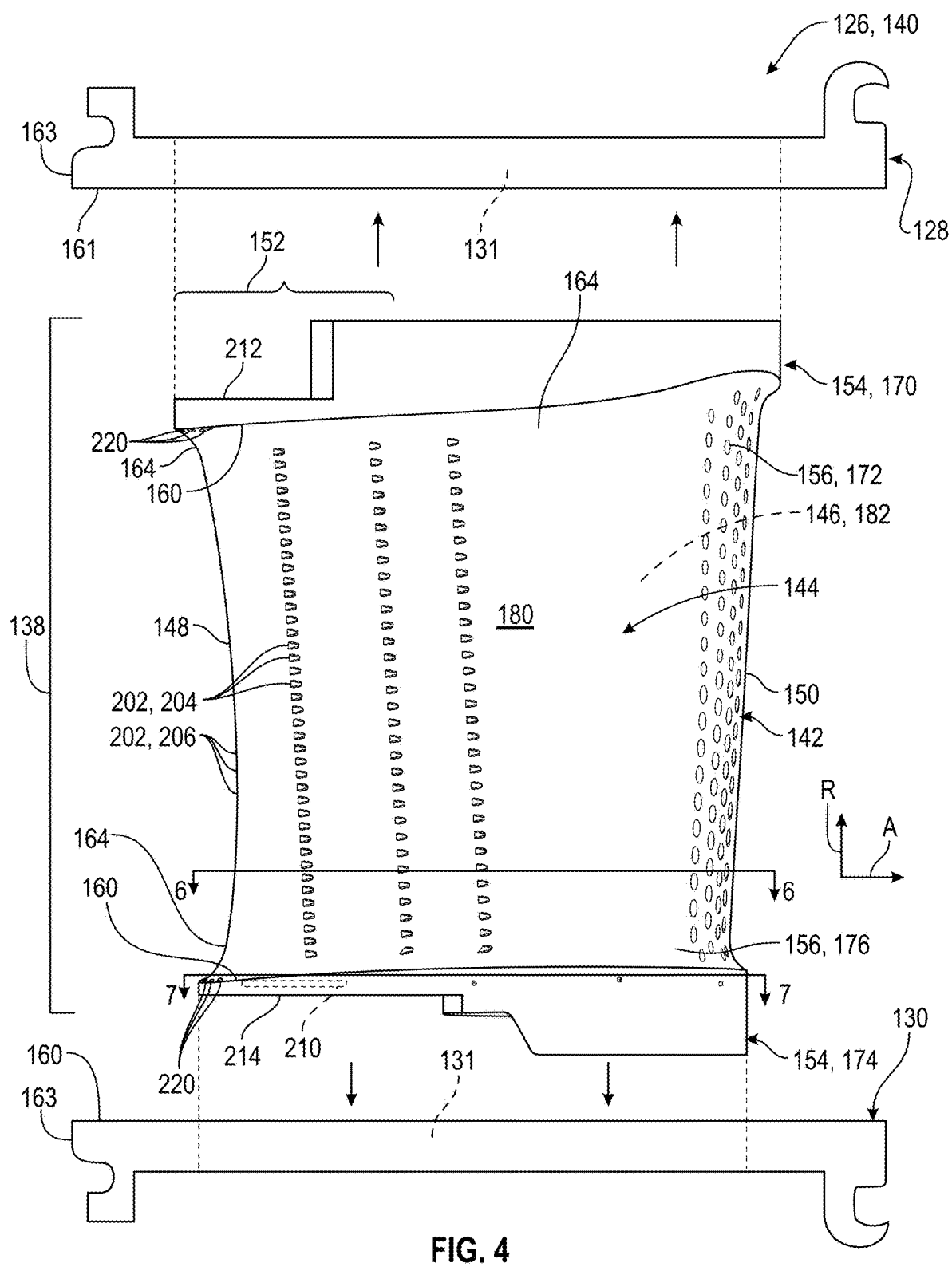
FIG. 4 shows a side view of a turbomachine component in the form of a stationary nozzle and including an airfoil component, according to embodiments of the disclosure.
Figure 5:
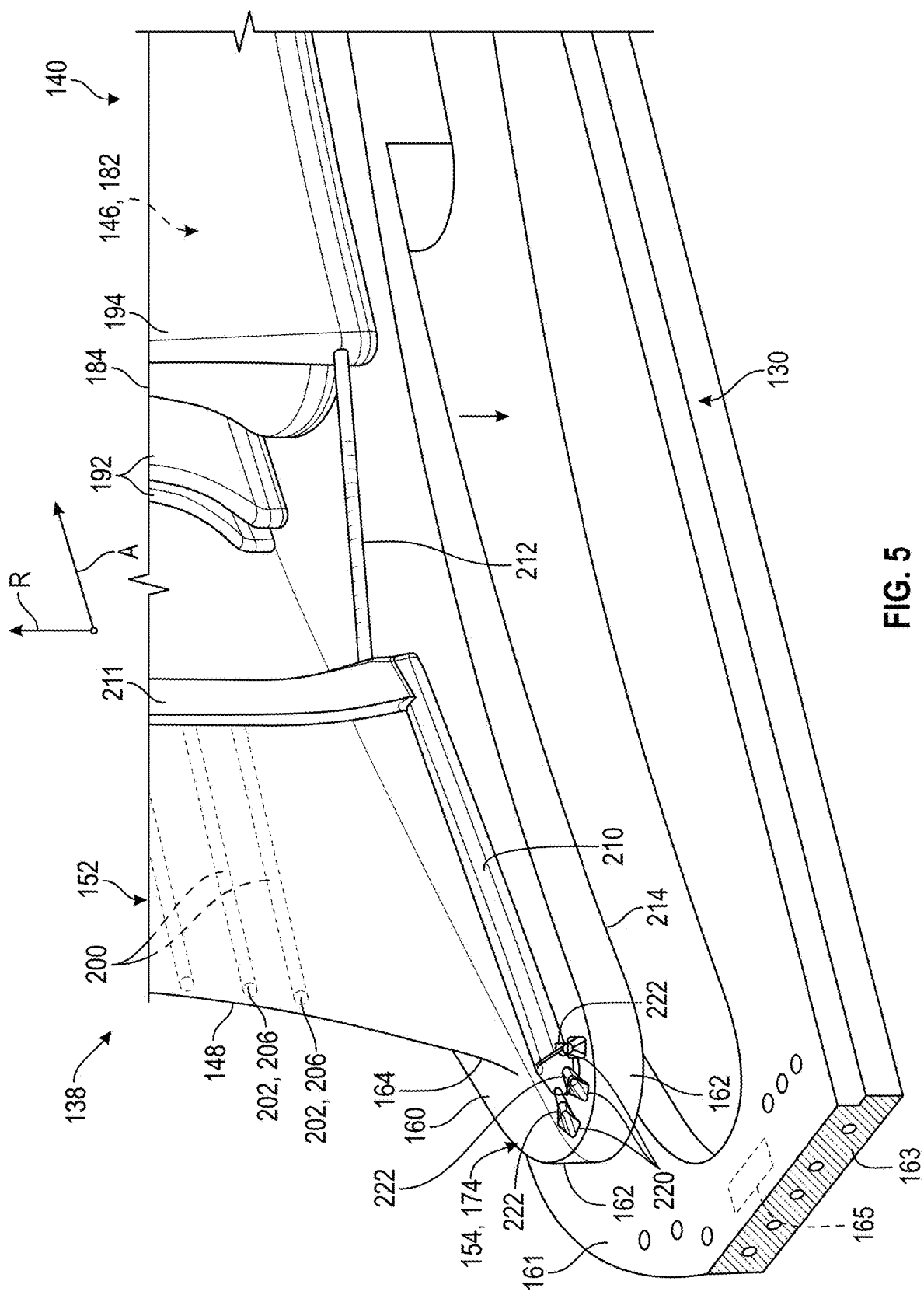
FIG. 5 shows an enlarged perspective view of a trailing portion of a turbomachine component in the form of a stationary nozzle and including an airfoil component, according to embodiments of the disclosure.
Figure 6:
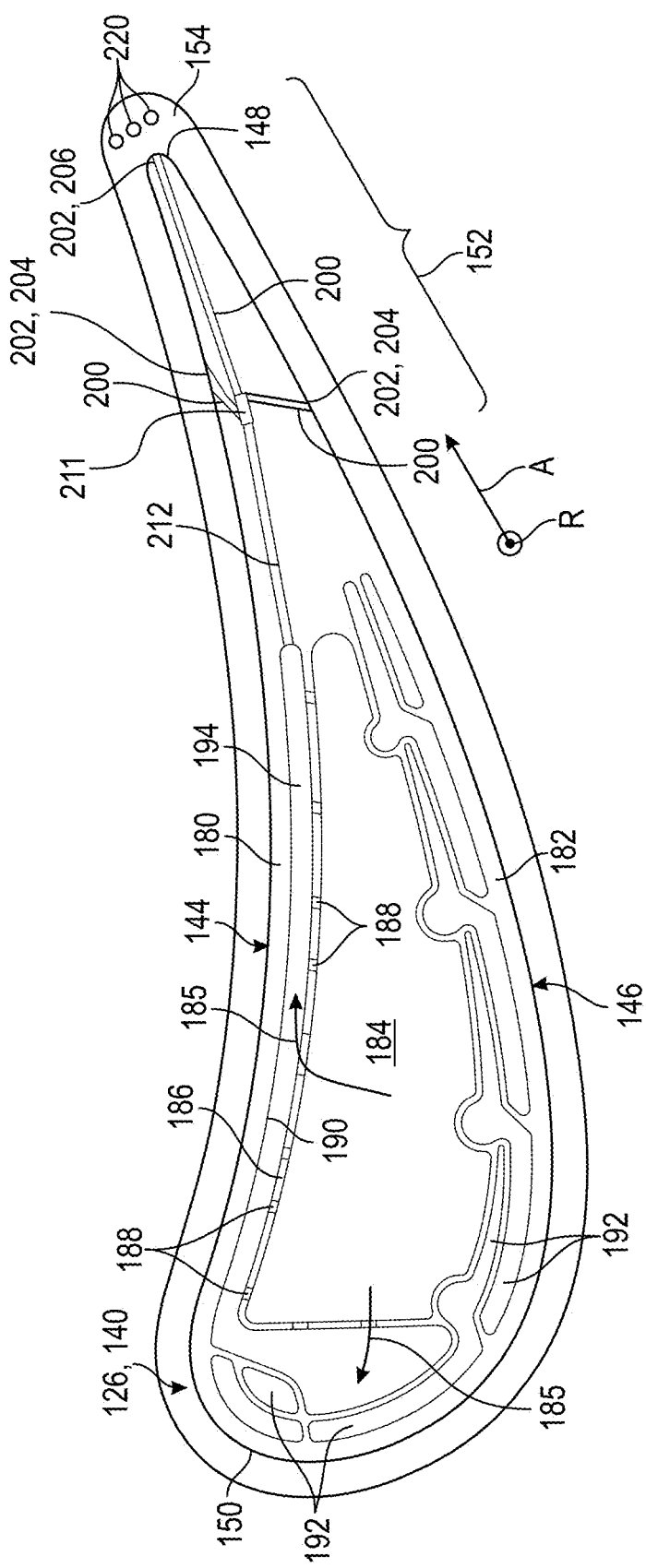
FIG. 6 shows a cross-sectional view of the airfoil component along view line 6-6 in FIG. 4, according to embodiments of the disclosure.
Figure 7:
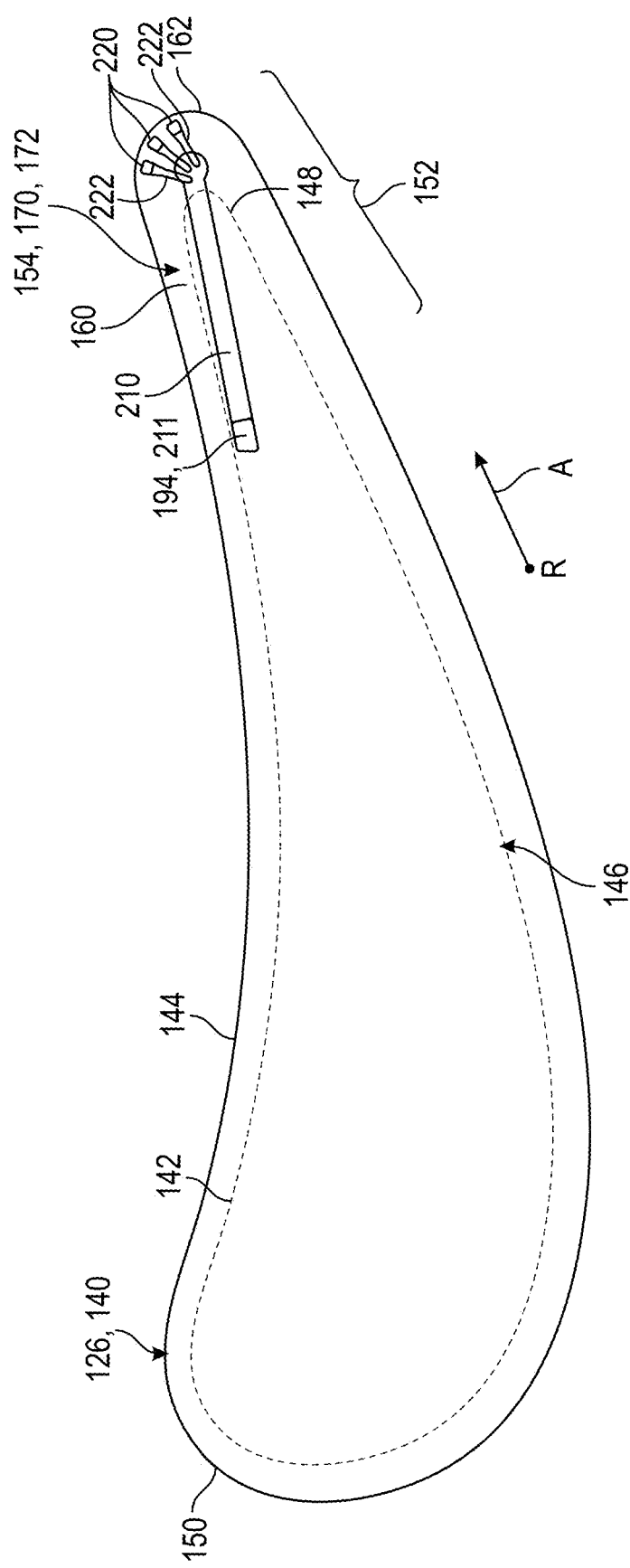
FIG. 7 shows a cross-sectional view of the airfoil component along view line 7-7 in FIG. 4, according to embodiments of the disclosure.

FIG. 3 shows a perspective view, FIG. 4 shows a side view, and FIG. 5 shows an enlarged perspective view (at a radial inner end) of a turbomachine component 140, e.g., a stationary nozzle 126 (hereafter "nozzle 126"), including at least one airfoil component 138 of the type in which embodiments of the present disclosure may be employed. In FIGS. 3-5, turbomachine component 140 is shown in an exploded arrangement with airfoil component 138 distanced from platforms 128, 130 to show the various parts thereof more clearly. In addition, FIG. 6 shows a cross-sectional view of airfoil component 138 along view line 6-6 in FIG. 4, and FIG. 7 shows a cross-sectional view of airfoil component 138 along view line 7-7 in FIG. 4 according to embodiments of the disclosure.

Airfoil component 138 includes an airfoil body 142 having a pressure side 144, a suction side 146 and a trailing edge 148. Airfoil body 142 also includes a leading edge 150 opposite trailing edge 148. Trailing edge 148 is at an axial end of a trailing portion 152 of airfoil body 142. Airfoil component 138 also includes an airfoil mount 154 coupled to at least one end 156 of airfoil body 142. Each airfoil mount 154 includes a flow path facing surface 160 and a sidewall 162. Flow path facing surface 160 extends away from a respective end 172, 176 of airfoil body 142. In the example shown, an outer airfoil mount 170 is coupled to a (first) outer end 172 of airfoil body 142 with flow path facing surface 160 thereof facing radially inward, and an inner airfoil mount 174 is coupled to a (second) inner end 176 of airfoil body 142 with flow path facing surface 160 thereof facing radially outward.

Airfoil component 138 may also optionally include a fillet 164 between trailing edge 148 of airfoil body 142 and flow path facing surface 160 of each airfoil mount 154. It will be recognized that fillet 164 may not be present in certain situations where other connection mechanisms or airfoil profiles are used. As understood in the art, airfoil component 138 is coupled to a respective platform 128, 130 by airfoil mount 154, e.g., using mechanical couplings and/or welds/braze. Fillet 164 can be any curved surface that couples flow path facing surface 160 of airfoil mount 154 with a generally radially extending outer surface of airfoil body 142, e.g., trailing or leading edges 148, 150, pressure side outer wall 180 and/or suction side outer wall 182. Fillet 164 can be provided during additive manufacturing of airfoil body 142. Another fillet (not separately labeled) may be located between airfoil mount 154 and platform 128 or 130 and may be used to couple airfoil component 138 to platform 128 or 130, e.g., via welding or mechanical connectors, and may extend over a flow path facing surface 161 of a respective platform 128, 130. The fillet coupling airfoil component 138 to platform 128 or 130 may be similarly curved to fillet 164. As noted, in conventional arrangements, airfoil body 142 and the platform coupling fillet or braze material used to couple the parts can block cooling passages between trailing edge 148 of airfoil body 142 and a sidewall 163 of platform 128 or 130, e.g., in an area denoted by a dashed box in FIG. 5.

Where turbomachine component 140 includes a nozzle 126, as illustrated in FIGS. 3 and 4 in an exploded manner, two airfoil mounts 170 and 174 are used. That is, as noted previously, airfoil mount 154 coupled to at least one end 156 of airfoil body 142 includes an outer airfoil mount 170 on first (outer) end 172 of airfoil body 142 and inner airfoil mount 174 on an opposing, second (inner) end 176 of airfoil body 142. As shown in FIG. 2, platform 128 attaches nozzle 126 to stationary casing 122 (FIG. 2) of turbine 110. Platform 128 coupled to airfoil mount 170 may include any now known or later developed mounting configuration for mounting in a corresponding mount in the casing. Inner platform 130 positions nozzle 126 between adjacent turbine rotor blades 132 (FIG. 2) and radially inner platforms 134 (FIG. 2) thereof. Outer platform 128 positions nozzle 126 between adjacent blade tip shrouds 136 and or other shrouds (not labeled) of casing 122. Platforms 128, 130 define respective portions of the outboard and inboard boundary of a hot gas path (HGP) through turbine assembly 110.

It will be appreciated that airfoil body 142 is the active component of nozzle 126 that intercepts the flow of working fluid 151 (FIG. 2) and directs it towards turbine rotor blades 132 (FIG. 2). With further regard to airfoil body 142, as shown in FIGS. 3, 4 and 6, pressure side 144 of airfoil body 142 of nozzle 126 includes a concave pressure side (PS) outer wall 180 and suction side 146 of airfoil body 142 includes a circumferentially or laterally opposite convex suction side (SS) outer wall 182 extending axially between opposite leading edge 150 and trailing edge 148, respectively. When airfoil component 138 is coupled to platforms 128, 130, side outer walls 180 and 182 also extend in the radial direction from outer airfoil mount 170 and outer platform 128 to inner airfoil mount 174 and inner platform 130.

Referring to FIGS. 5 and 6, airfoil component 138 also includes a primary cooling plenum 184 extending through airfoil body 142 for directing a coolant 185 therethrough. In certain embodiments, primary cooling plenum 184 extends primarily radially in airfoil body 142, but some axial and/or circumferential extent(s) are also possible. That is, primary cooling plenum 184 can take a variety of forms but generally includes a radially extending opening through which coolant can pass, e.g., air within casing 122 (FIG. 2) from compressor 102 (FIG. 1) to cool parts of airfoil component 138, as will be described herein. In FIG. 6, primary cooling plenum 184 is illustrated as having one section; however, it may include any number of sections perhaps fluidly coupled in a sinusoidal fashion at inner and outer ends of airfoil body 142. Hence, primary cooling plenum 184 may include a single passage, two passages, or more than two passages. Primary cooling plenum 184 is referenced herein as "primary" because it is typically the largest volume plenum in airfoil body 142 and typically is the first passage through which coolant 185 enters airfoil body 142.

As shown in FIG. 6, airfoil component 138 also includes an impingement cooling member 186 within primary cooling plenum 184. Impingement cooling member 186 may include any now known or later developed impingement cooling structure, e.g., sleeve or wall, including a plurality of impingement openings 188 defined therein and configured to direct coolant 185 from primary cooling plenum 184 toward an inner surface 190 of part of airfoil body 142. Inner surface 190 of part of airfoil body 142 can take a variety of forms depending on characteristics of impingement cooling member 186 such as but not limited to a length, a cross-sectional or lengthwise shape, and/or number of impingement openings 188 therein. In the non-limiting example shown, impingement cooling member 186 has a general L-shape within primary cooling plenum 184 and directs coolant 185 in two directions towards inner surface 190 of airfoil body 142 (e.g., toward leading edge 150 and pressure side 144). As illustrated, a variety of other cooling features 192 may also be provided within airfoil body 142.

FIGS. 5 and 6 also show airfoil component 138 including a collection plenum 194 defined in airfoil body 142 and configured to collect coolant 185 exiting plurality of impingement openings 188 (i.e., post-impingement coolant). Collection plenum 194 can have any form capable of collecting coolant 185. In certain embodiments, collection plenum 194 is an open volume between impingement cooling member 186 and inner surface 190 of pressure side 144 of airfoil body 142. In the example shown, collection plenum 194 is primarily along pressure side outer wall 180, but it could extend into other regions of airfoil body 142, as will be described herein.

As shown in FIG. 6, airfoil component 138 also includes a plurality of cooling passages 200 defined in airfoil body 142 and in fluid communication with collection plenum 194. Each cooling passage 200 extends to at least one first film cooling opening 202 through pressure side 144, suction side 146 and/or trailing edge 148 of airfoil body 142. In the example in FIG. 6, cooling passages 200 feed cooling openings 202 in pressure side 144, suction side 146 and/or trailing edge 148. Cooling openings 202 can take different forms. For example, cooling openings 202 can be diffuser shaped openings 204 to create a cooling film (not shown) along suction side 146, i.e., suction side outer wall 182. Although less likely, it may also be possible for cooling openings 202 in the form of diffuser shaped openings 204 to create a cooling film (not shown) along pressure side 144, i.e., pressure side outer wall 180. In another example, cooling openings 202 can be exit openings 206 in trailing edge 148. It will be recognized that not all of the cooling passages 200 and cooling openings 202 shown need to be used in all circumstances.

In certain embodiments, as shown in FIGS. 5 and 6, where necessary, a distribution plenum 211 may be positioned between collection plenum 194 and plurality of cooling passages 200. Distribution plenum 211 may be desired to direct (post-impingement) coolant 185 to any number of cooling passages 200 not readily connectable to collection plenum 194, e.g., because of intervening structure. Where necessary, one or more connection passage(s) 212 (FIGS. 5 and 6) may fluidly couple collection plenum 194 and distribution plenum 211. Distribution plenum 211 can pass through airfoil body 142 in any manner to deliver coolant 185 where desired. In any event, coolant 185 may pass through cooling passage(s) 200 to cool, e.g., parts of trailing portion 152 of airfoil body 142, and to exit from cooling openings 202, wherever located.

In order to address cooling of airfoil mount(s) 154 and flow path facing surface 161 of a respective platform 128, 130, airfoil component 138 includes a mount cooling plenum 210 defined, at least in part, in each airfoil mount 154 and in fluid communication with collection plenum 194. Mount cooling plenum 210 may be in direct fluid communication with collection plenum 194 or may be in fluid communication with collection plenum 194 via distribution plenum 211. As shown in FIGS. 5-7, mount cooling plenum 210 extends aft toward, and possibly beyond, trailing edge 148 of airfoil body 142 within airfoil mount 154. Most of mount cooling plenum 210 extends generally axially toward trailing edge 148 and lies within a radial extent of airfoil mount 154, i.e., it is disposed radially within airfoil mount 154 between a flow path facing surface 160 and surface 214 of airfoil mount 154 facing away from the flow path but may not extend radially into airfoil body 142. In this manner, mount cooling plenum 210 cools airfoil mount 154. However, in some cases, a small vertical portion of mount cooling plenum 210 (that is not part of collection plenum 194 or distribution plenum 211) may extend radially outward beyond flow path facing surface 160 of airfoil mount 154 and into airfoil body 142 (e.g., into fillet 164, where provided).

A subset of plurality of cooling passages 200 extends through trailing portion 152 of airfoil body 142 to exit opening(s) 206 in trailing edge 148. Mount cooling plenum 210 may extend in each airfoil mount 154 parallel to the subset of plurality of cooling passages 200 extending through trailing portion 152 of airfoil body 142. This arrangement can be observed in FIGS. 5-7 by the generally overlapping location of cooling passages 200 extending through trailing portion 152 of airfoil body 142 with mount cooling plenum 210, which is under cooling passage 200 in airfoil mount 154.

As shown in FIGS. 4-7, airfoil component 138 also includes a plurality of second cooling openings 220 defined in flow path facing surface 160 of each airfoil mount 154 downstream of trailing edge 148. Plurality of second cooling openings 220 are in fluid communication with mount cooling plenum 210, e.g., directly or via a number of respective connecting passages 222 (FIGS. 5 and 7). Plurality of second cooling openings 220 can have any shape, but in certain embodiments as shown, each include a diffuser shaped opening (i.e., diverging in the flow direction, as shown in FIG. 5), which aids in creating a film of coolant over the flow path facing surface 160 of airfoil mount 154 and over flow path facing surface 161 and sidewall 163 of platform 128 or 130. In this manner, coolant 185 can pass through airfoil mount 154 and be directed at cooling flow path facing surface 161 and sidewall 163 of platform 128 or 130 where normally that area (see dashed box 165 in FIG. 5) would not be cooled. Plurality of second cooling openings 220 are arranged in a line parallel to sidewall 162 of each airfoil mount 154 and where it mates with opening 131 in platform 128 or 130. That is, they are aligned along mating surfaces where cooling is desired. For example, in certain embodiments and as shown in FIG. 7, sidewall 162 of each airfoil mount 154 downstream of trailing edge 148 is curved around trailing edge 148 of airfoil body 142, and cooling openings 220 are arranged in a line curving parallel to sidewall 162 of each airfoil mount 154 downstream of trailing edge 148. In this manner, coolant 185 can pass through airfoil mount 154 and be directed along curved sidewall 162 of airfoil mount 154, over flow path facing surfaces 160, 161 and sidewall 163.

It will be recognized that the teachings of the disclosure may be applied to airfoil mount 154 coupled to one or more ends 156 of airfoil body 142. That is, the teachings of the disclosure may be applied to, as shown in FIGS. 3-4, outer airfoil mount 170 on first (outer) end 172 of airfoil body 142 and/or inner airfoil mount 174 on opposing, second (inner) end 176 of airfoil body 142. The teachings of the disclosure may also be applied to radially inner airfoil mount for platform 134 (FIG. 2) of turbine rotating blades 132 (FIG. 2) in a similar manner to that described herein.

Figure 8:
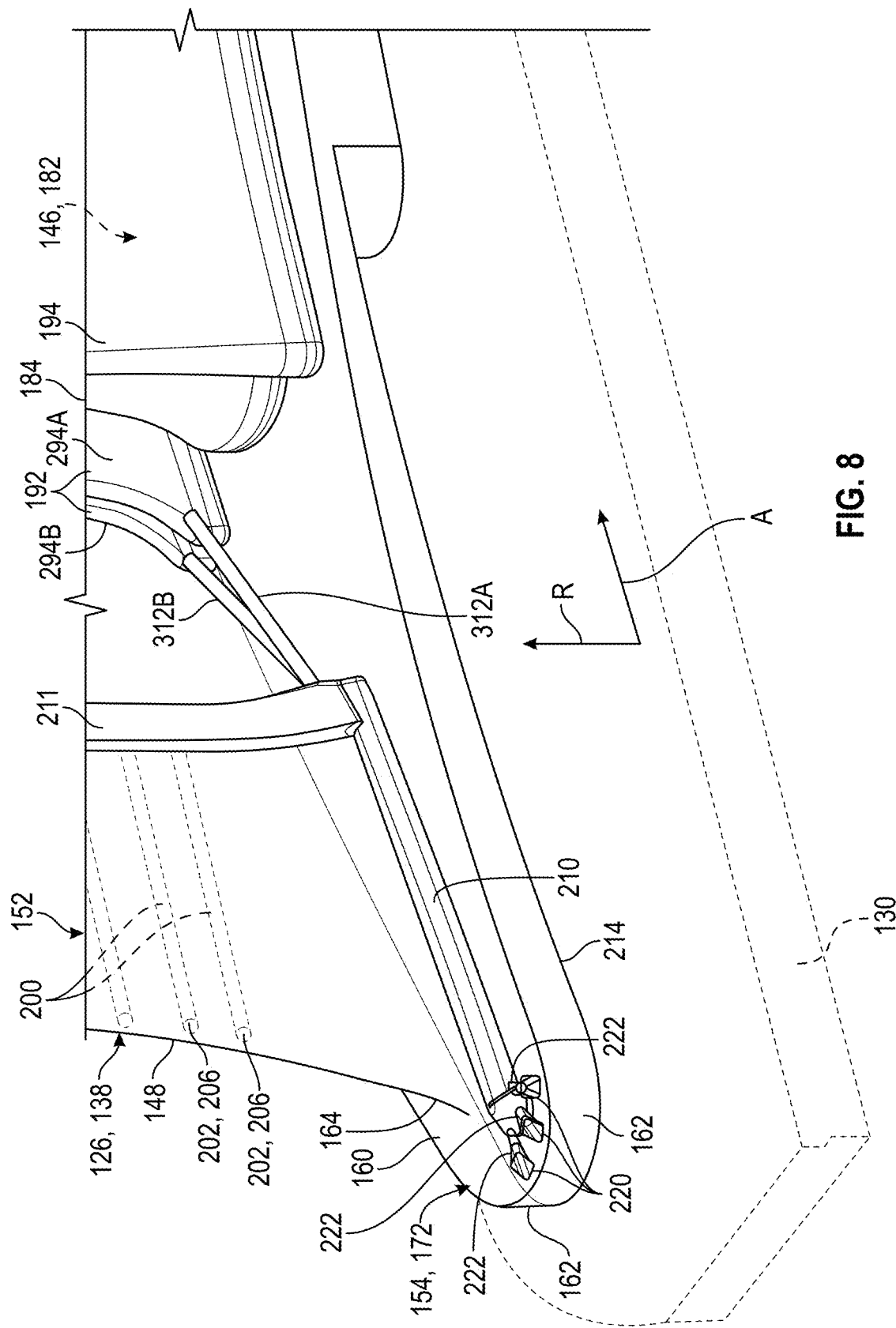
FIG. 8 shows an enlarged perspective view of a trailing portion of a turbomachine component in the form of a stationary nozzle and including an airfoil component, according to other embodiments of the disclosure.
Figure 9:
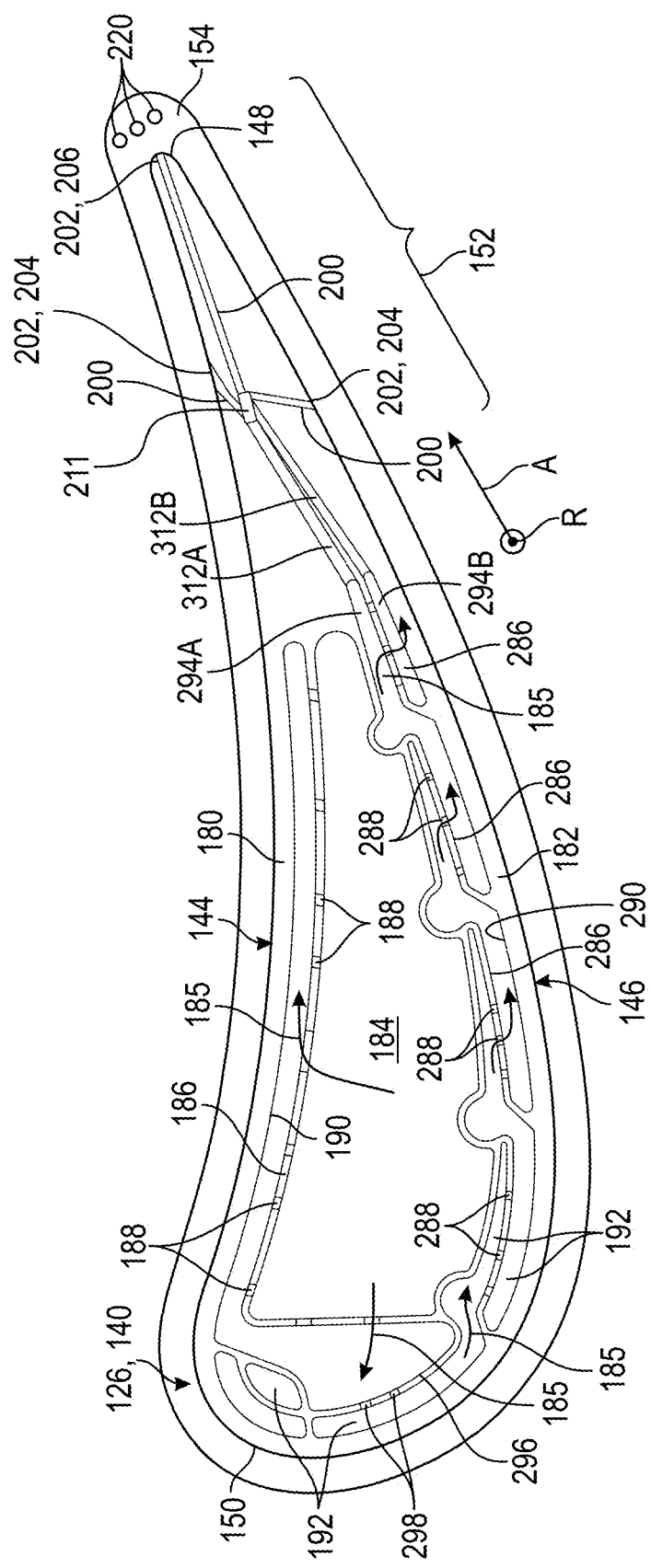
FIG. 9 shows a cross-sectional view of the airfoil component of FIG. 8 similar to view line 6-6 in FIG. 4, according to other embodiments of the disclosure.

FIG. 8 shows an enlarged perspective view of a trailing portion of an airfoil component 138 in the form of a stationary nozzle, and FIG. 9 shows a cross-sectional view of the airfoil component of FIG. 8 (similar to view line 6-6 in FIG. 4), according to other embodiments of the disclosure. FIGS. 8 and 9 show an embodiment in which a collection plenum 294 (two shown, labelled 294A, 294B) is primarily along suction side outer wall 182, rather than pressure side outer wall 180 (collection plenum 194) as in FIGS. 5-6. Here, airfoil component 138 includes one or more collection plenums 294A, 294B defined in airfoil body 142 and configured to collect coolant 185 exiting plurality of impingement openings 188 and passing through other cooling features 192 closer to suction side 146 than pressure side 144. Collection plenums 294A, 294B can have any form capable of collecting coolant 185 after it passes through other cooling features 192. While a particular arrangement of other cooling features 192 are shown, they can take a variety of forms.

In the example shown, cooling features 192 may include impingement openings 198 through impingement cooling member 186, which fluidly couple primary cooling plenum 184 to collection plenum 194 on pressure side 144 and/or leading edge 150; impingement openings 298 through wall 296 at leading edge 150, which fluidly couple collection plenum 194 to a leading edge cooling plenum; and impingement openings 288 through impingement cooling members 286 along suction side 146, which deliver coolant to collection plenums 294A, 294B. Coolant 185 may be supplied in any manner to other cooling features 192 after it passes through impingement openings 188 of impingement cooling member 186, e.g., as shown in FIG. 9, via openings 298 in leading edge-facing wall 296 to other cooling features 192. In certain embodiments, collection plenum(s) 294A, 294B are an open volume between any variety of secondary impingement cooling members 286 of other cooling features 192 and inner surface 290 of suction side 146 of airfoil body 142. In the example shown, two collection plenum(s) 294A, 294B are shown; however, any number may be provided. In FIGS. 8 and 9, a connection passage 312A fluidly couples collection plenum 294A to distribution plenum 211, and a connection passage 312B fluidly couples collection plenum 294B to distribution plenum 211. However, it is emphasized that only one of collection plenums 294A, 294B may be used, if desired (in which case a single connection passage may also be employed).

Embodiments of the disclosure may also include, as shown in FIGS. 1-2, turbomachine 100 including compressor 102, combustor 104 operatively coupled to compressor 102, and turbine 110 operatively coupled to combustor 104. Turbine 110 includes one or more turbomachine components 140 including airfoil components 138, as described herein, and a platform 128 or 130. As noted, each platform 128 or 130 is coupled to airfoil mount 154 around sidewall 162 thereof. As noted, the coolant from plurality of second cooling openings 220 defined in flow path facing surface 160 of airfoil mount 154 cools a respective platform 128 or 130, e.g., flow path facing surface 161 and sidewall 163 thereof.

Figures 10, 11:
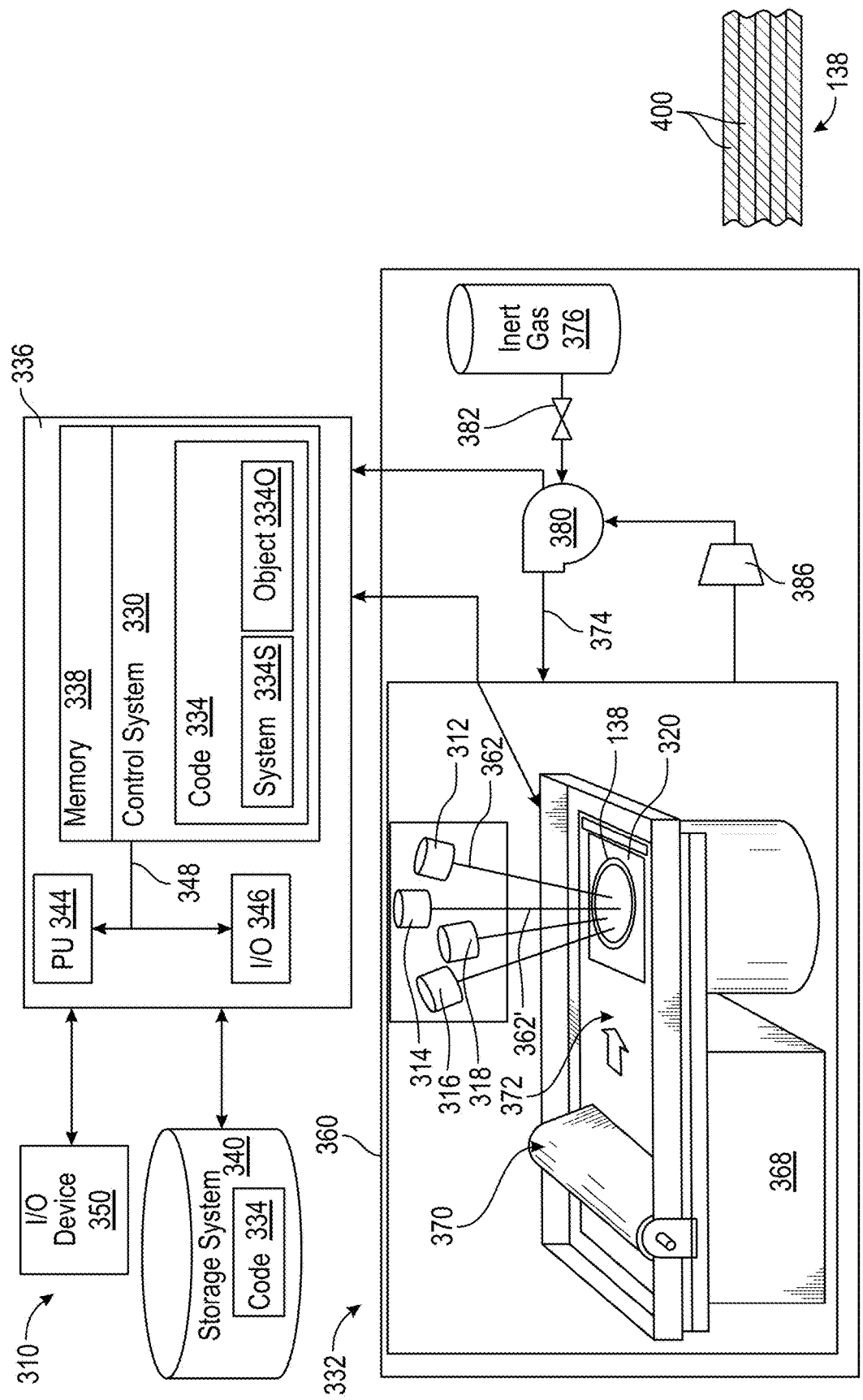
FIG. 10 shows a schematic block diagram of an illustrative additive manufacturing system for additively manufacturing an airfoil component, according to embodiments of the disclosure.
FIG. 11 shows a cross-sectional view of a plurality of parallel, sintered metal layers of an airfoil component, according to embodiments of the disclosure.

A method according to embodiments of the disclosure may include additively manufacturing airfoil component 138, as described herein, and coupling airfoil component 138 to at least one platform 128, 130 having opening 131 configured to mate with airfoil mount 154 of airfoil component 138, i.e., to form turbomachine component 140 which is used in turbomachine 100. Again, as noted, the coolant from plurality of second cooling openings 220 defined in flow path facing surface 160 of airfoil mount 154 cools the airfoil mount and a respective platform 128 or 130, e.g., flow path facing surface 161 and sidewall 163 thereof. FIG. 10 shows a schematic/block view of an illustrative computerized metal powder additive manufacturing system 310 (hereinafter 'AM system 310') for generating airfoil component 138 (and separately perhaps platforms 128, 130), of which only a single layer is shown. The teachings of the disclosures will be described relative to building airfoil component 138 using multiple melting beam sources 312, 314, 316, 318, but it is emphasized and will be readily recognized that the teachings of the disclosure are equally applicable to build airfoil component 138 using any number of melting beam sources. In this example, AM system 310 is arranged for direct metal laser melting (DMLM). It is understood that the general teachings of the disclosure are equally applicable to other forms of metal powder additive manufacturing such as but not limited to selective laser melting (SLM), and perhaps other forms of additive manufacturing (i.e., other than metal powder applications). The layer of airfoil component 138 in build platform 320 is illustrated as a circular element in FIG. 10; however, it is understood that the additive manufacturing process can be readily adapted to manufacture any shape on build platform 320, e.g., that of airfoil body 142 or airfoil mount(s) 154.

AM system 310 generally includes an additive manufacturing control system 330 ("control system") and an AM printer 332. As will be described, control system 330 executes set of computer-executable instructions or code 334 to generate airfoil component 138 using multiple melting beam sources 312, 314, 316, 318. In the example shown, four melting beam sources may include four lasers. However, the teachings of the disclosures are applicable to any melting beam source, e.g., an electron beam, laser, etc. Control system 330 is shown implemented on computer 336 as computer program code. To this extent, computer 336 is shown including a memory 338 and/or storage system 340, a processor unit (PU) 344, an input/output (I/O) interface 346, and a bus 348. Further, computer 336 is shown in communication with an external I/O device/resource 350. In general, processor unit (PU) 344 executes computer program code 334 that is stored in memory 338 and/or storage system 340. While executing computer program code 334, processor unit (PU) 344 can read and/or write data to/from memory 338, storage system 340, I/O device 350 and/or AM printer 332. Bus 348 provides a communication link between each of the components in computer 336, and I/O device 350 can comprise any device that enables a user to interact with computer 336 (e.g., keyboard, pointing device, display, etc.).

Computer 336 is only representative of various possible combinations of hardware and software. For example, processor unit (PU) 344 may comprise a single processing unit or be distributed across one or more processing units in one or more locations, e.g., on a client and server. Similarly, memory 338 and/or storage system 340 may reside at one or more physical locations. Memory 338 and/or storage system 340 can comprise any combination of various types of non-transitory computer readable storage medium including magnetic media, optical media, random access memory (RAM), read only memory (ROM), etc. Computer 336 can comprise any type of computing device such as an industrial controller, a network server, a desktop computer, a laptop, a handheld device, etc.

As noted, AM system 310 and, in particular control system 330, executes code 334 to generate airfoil component 138 (and perhaps platform(s) 128, 130). Code 334 can include, among other things, a set of computer-executable instructions 334S (herein also referred to as 'code 334S') for operating a system (i.e., AM printer 332) and a set of computer-executable instructions 3340 (herein also referred to as 'code 3340') for defining an object (i.e., airfoil component 138) to be physically generated by AM printer 332. As described herein, additive manufacturing processes begin with a non-transitory computer readable storage medium (e.g., memory 338, storage system 340, etc.) storing code 334. Set of computer-executable instructions 334S for operating AM printer 332 may include any now known or later developed software code capable of operating AM printer 332.

The set of computer-executable instructions 3340 defining airfoil component 138 may include a precisely defined 3D model of airfoil component 138 and can be generated from any of a large variety of well-known computer aided design (CAD) software systems such as AutoCAD®, TurboCAD®, DesignCAD 3D Max, etc. In this regard, code 3340 can include any now known or later developed file format. Furthermore, code 3340 representative of the part to be built, e.g., airfoil component 138 or platforms 128, 130, 134, may be translated between different formats. For example, code 3340 may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 3340 representative of airfoil component 138 may also be converted into a set of data signals and transmitted, received as a set of data signals and converted to code, stored, etc., as necessary. Code 3340 may be configured according to embodiments of the disclosure to allow for formation of border and internal sections in overlapping field regions, as will be described. In any event, code 3340 may be an input to AM system 310 and may come from a part designer, an intellectual property (IP) provider, a design company, the operator or owner of AM system 310, or from other sources. In any event, control system 330 executes code 334S and 3340, dividing airfoil component 138 (and separately perhaps platform(s) 128, 130) into a series of thin slices that assembles using AM printer 332 in successive layers of material.

AM printer 332 may include a processing chamber 360 that is sealed to provide a controlled atmosphere for airfoil component 138 printing. A build platform 320, upon which airfoil component 138 is/are built, is positioned within processing chamber 360. A number of melting beam sources 312, 314, 316, 318 are configured to melt layers of metal powder on build platform 320 to generate airfoil component 138 (and separately perhaps platform(s) 128, 130). While four melting beam sources 312, 314, 316, 318 are illustrated, it is emphasized that the teachings of the disclosure are applicable to a system employing any number of sources, e.g., 1, 2, 3, or 5 or more. As understood in the field, each melting beam source 312, 314, 316, 318 may have a field including a non-overlapping field region, respectively, in which it can exclusively melt metal powder, and may include at least one overlapping field region in which two or more sources can melt metal powder. In this regard, each melting beam source 312, 314, 316, 318 may generate a melting beam, respectively, that fuses particles for each slice, as defined by code 3340. For example, in FIG. 10, melting beam source 312 is shown creating a layer of airfoil component 138 using melting beam 362 in one region, while melting beam source 314 is shown creating a layer of airfoil component 138 using melting beam 362' in another region. Each melting beam source 312, 314, 316, 318 is calibrated in any now known or later developed manner. That is, each melting beam source 312, 314, 316, 318 has had its laser or electron beam's anticipated position relative to build platform 320 correlated with its actual position in order to provide an individual position correction (not shown) to ensure its individual accuracy. In one embodiment, each of plurality melting beam sources 312, 314, 316, 318 may create melting beams, e.g., 362, 362', having the same cross-sectional dimensions (e.g., shape and size in operation), power and scan speed.

Continuing with FIG. 10, an applicator (or re-coater blade) 370 may create a thin layer of raw material 372 spread out as the blank canvas from which each successive slice of the final airfoil component 138 will be created. Various parts of AM printer 332 may move to accommodate the addition of each new layer, e.g., a build platform 320 may lower and/or chamber 360 and/or applicator 370 may rise after each layer. The process may use different raw materials in the form of fine-grain metal powder, a stock of which may be held in a chamber 368 accessible by applicator 370.

Processing chamber 360 is filled with an inert gas such as argon or nitrogen and controlled to reduce or eliminate oxygen. Control system 330 is configured to control a flow of a gas mixture 374 within processing chamber 360 from a source of inert gas 376. In this case, control system 330 may control a pump 380, and/or a flow valve system 382 for inert gas to control the content of gas mixture 374. Flow valve system 382 may include one or more computer controllable valves, flow sensors, temperature sensors, pressure sensors, etc., capable of precisely controlling flow of the particular gas. Pump 380 may be provided with or without valve system 382. Where pump 380 is omitted, inert gas may simply enter a conduit or manifold prior to introduction to processing chamber 360. Source of inert gas 376 may take the form of any conventional source for the material contained therein, e.g., a tank, reservoir or other source. Any sensors (not shown) required to measure gas mixture 374 may be provided. Gas mixture 374 may be filtered using a filter 386 in a conventional manner.

In operation, build platform 320 with metal powder thereon is provided within processing chamber 360, and control system 330 controls flow of gas mixture 374 within processing chamber 360 from source of inert gas 376. Control system 330 also controls AM printer 332, and in particular, applicator 370 and melting beam sources 312, 314, 316, 318 to sequentially melt layers of metal powder on build platform 320 to generate the desired part according to embodiments of the disclosure. While a particular AM system 310 has been described herein, it is emphasized that the teachings of the disclosure are not limited to any particular additive manufacturing system or method.

Once airfoil component 138 is formed and turbomachine component 140 is formed by coupling platforms 128, 130 and/or 134, as shown in FIG. 2, component 140 may be installed with other parts of turbine 110 to form turbine 110. The installation may include any now known or later developed technique for installing the particular turbomachine component 140 used. As noted, airfoil component 138 and/or (separately) platforms 128, 130, 134 may be additively manufactured using any now known or later developed technique. Consequently, as shown in the cross-section of FIG. 11 of any part of airfoil component 138 includes a plurality of parallel sintered metal layers 400 throughout an entire height thereof.

The disclosure provides various technical and commercial advantages, examples of which are discussed herein. The cooling arrangement provides more precise airfoil mount and platform surface and sidewall cooling in a manner not previously possible using conventional manufacturing techniques, resulting in improved overall performance for the component and turbomachine. Implementation of diffuser shaped cooling holes emanating from just downstream of the airfoil body trailing edge fillet can provide sidewall film cooling for both the airfoil mount, and surfaces and sidewalls of the respective platform(s). The airfoil component can be advantageously additively manufactured.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" or "about," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

What is claimed is:

1. An airfoil component, comprising:
   an airfoil body having a pressure side, a suction side, and a trailing edge;
   an airfoil mount coupled to at least one end of the airfoil body, each airfoil mount including a flow path facing surface and a sidewall;
   a primary cooling plenum extending through the airfoil body for directing a coolant therethrough;
   an impingement cooling member within the primary cooling plenum, the impingement cooling member including a plurality of impingement openings defined therein configured to direct the coolant from the primary cooling plenum toward an inner surface of part of the airfoil body;
   a collection plenum defined in the airfoil body configured to collect the coolant exiting the plurality of impingement openings;
   a plurality of cooling passages defined in the airfoil body and in fluid communication with the collection plenum, each of the plurality of cooling passages extending to at least one first film cooling opening through at least one of the pressure side, the suction side, or the trailing edge of the airfoil body;
   a mount cooling plenum defined, at least in part, in each airfoil mount and in fluid communication with the collection plenum;

a platform coupled to each airfoil mount around the sidewall thereof; and a plurality of second cooling openings defined in the flow path facing surface of each airfoil mount downstream of the trailing edge, the plurality of second cooling openings in fluid communication with the mount cooling plenum.

2. The airfoil component of claim 1, wherein the plurality of second cooling openings is arranged in a line parallel to the sidewall of each airfoil mount.

3. The airfoil component of claim 1, wherein the sidewall of each airfoil mount downstream of the trailing edge is curved around the trailing edge of the airfoil body, and the plurality of second cooling openings is arranged in a line curving parallel to the sidewall of each airfoil mount downstream of the trailing edge.

4. The airfoil component of claim 1, wherein each of the plurality of second cooling openings includes a diffuser shaped opening.

5. The airfoil component of claim 1, wherein a subset of the plurality of cooling passages extends through a trailing portion of the airfoil body to the at least one first film cooling opening in the trailing edge, wherein the mount cooling plenum extends in the airfoil mount parallel to the subset of the plurality of cooling passages extending through the trailing portion of the airfoil body.

6. The airfoil component of claim 1, wherein the airfoil component includes a plurality of parallel sintered metal layers throughout an entire height thereof.

7. The airfoil component of claim 1, wherein the airfoil mount coupled to the at least one end of the airfoil body includes an outer airfoil mount on a first end of the airfoil body and an inner airfoil mount on an opposing, second end of the airfoil body.

8. A turbomachine component including the airfoil component of claim 1, wherein the coolant from the plurality of second cooling openings defined in the flow path facing surface thereof cools a respective platform.

9. A turbomachine, comprising:
a compressor;
a combustor operatively coupled to the compressor; and
a turbine operatively coupled to the combustor, the turbine including an airfoil component including:
an airfoil body having a pressure side, a suction side, and a trailing edge;
an airfoil mount coupled to at least one end of the airfoil body, each airfoil mount including a flow path facing surface and a sidewall;
a primary cooling plenum extending through the airfoil body for directing a coolant therethrough;
an impingement cooling member within the primary cooling plenum, the impingement cooling member including a plurality of impingement openings defined therein configured to direct the coolant from the primary cooling plenum toward an inner surface of part of the airfoil body;
a collection plenum defined in the airfoil body configured to collect the coolant exiting the plurality of impingement openings;
a plurality of cooling passages defined in the airfoil body and in fluid communication with the collection plenum, each of the plurality of cooling passages extending to at least one first film cooling opening through at least one of the pressure side, the suction side, or the trailing edge of the airfoil body;

a mount cooling plenum defined, at least in part, in each airfoil mount and in fluid communication with the collection plenum;
a platform coupled to each airfoil mount around the sidewall thereof; and
a plurality of second cooling openings defined in the flow path facing surface of each airfoil mount downstream of the trailing edge, the plurality of second cooling openings in fluid communication with the mount cooling plenum.

10. The turbomachine of claim 9, wherein the plurality of second cooling openings is arranged in a line parallel to the sidewall of each airfoil mount.

11. The turbomachine of claim 9, wherein the sidewall of each airfoil mount is downstream of the trailing edge of the airfoil body and is curved around the trailing edge of the airfoil body, and the plurality of second cooling openings is arranged in a line curving parallel to the sidewall of each airfoil mount downstream of the trailing edge.

12. The turbomachine of claim 9, wherein each of the plurality of second cooling openings includes a diffuser shaped opening.

13. The turbomachine of claim 9, wherein a subset of the plurality of cooling passages extends through a trailing portion of the airfoil body to the at least one first film cooling opening in the trailing edge, wherein the mount cooling plenum extends in the airfoil mount parallel to the subset of the plurality of cooling passages extending through the trailing portion of the airfoil body.

14. The turbomachine of claim 9, wherein the airfoil component includes a plurality of parallel sintered metal layers throughout an entire height thereof.

15. The turbomachine of claim 9, wherein the airfoil mount coupled to the at least one end of the airfoil body includes an outer airfoil mount on a first end of the airfoil body and an inner airfoil mount on an opposing, second end of the airfoil body.

16. The turbomachine of claim 9, wherein the coolant from the plurality of second cooling openings defined in the flow path facing surface thereof cools a respective platform.

17. A method, comprising:
additively manufacturing an airfoil component, the airfoil component including:
an airfoil body having a pressure side, a suction side, and a trailing edge;
an airfoil mount coupled to at least one end of the airfoil body, each airfoil mount including a flow path facing surface and a sidewall;
a primary cooling plenum extending through the airfoil body for directing a coolant therethrough;
an impingement cooling member within the primary cooling plenum, the impingement cooling member including a plurality of impingement openings defined therein configured to direct the coolant from the primary cooling plenum toward an inner surface of part of the airfoil body;
a collection plenum defined in the airfoil body configured to collect coolant exiting the plurality of impingement openings;
a plurality of cooling passages defined in the airfoil body and in fluid communication with the collection plenum, each the plurality of cooling passages extending to at least one first film cooling opening through one of the pressure side, the suction side, or the trailing edge of the airfoil body;

a mount cooling plenum defined, at least in part, in the airfoil mount and in fluid communication with the collection plenum; and a plurality of second cooling openings defined in the flow path facing surface of each airfoil mount downstream of the trailing edge, the plurality of second cooling openings in fluid communication with the mount cooling plenum, wherein the airfoil component includes a plurality of parallel sintered metal layers throughout an entire height thereof; and coupling the airfoil component to at least one platform having an opening configured to mate with the airfoil mount, wherein the coolant from the plurality of second cooling openings defined in the flow path facing surface of the airfoil mount cools a respective platform.

18. The method of claim 17, wherein the plurality of second cooling openings is arranged in a line parallel to the sidewall of each airfoil mount.

19. The method of claim 17, wherein the sidewall of the airfoil mount is downstream of the trailing edge of the airfoil body and curved around the trailing edge of the airfoil body, and the plurality of second cooling openings is arranged in a line curving parallel to the sidewall of each airfoil mount downstream of the trailing edge.

20. The method of claim 17, wherein a subset of the plurality of cooling passages extends through a trailing portion of the airfoil body to the at least one first film cooling opening in the trailing edge, wherein the mount cooling plenum extends in the airfoil mount parallel to the subset of the plurality of cooling passages extending through the trailing portion of the airfoil body.

* * * * *